(12) United States Patent
Wang et al.

(10) Patent No.: US 9,193,920 B2
(45) Date of Patent: Nov. 24, 2015

(54) METHODS FOR PRODUCING LINEAR ALKYLBENZENES FROM BIO-RENEWABLE FEEDSTOCKS

(75) Inventors: Haiyan Wang, Hoffman Estates, IL (US); Michael J. McCall, Geneva, IL (US)

(73) Assignee: UOP LLC, Des Plaines, IL (US)

( * ) Notice: Subject to any disclaimer, the term of this patent is extended or adjusted under 35 U.S.C. 154(b) by 833 days.

(21) Appl. No.: 13/523,741

(22) Filed: Jun. 14, 2012

(65) Prior Publication Data

US 2013/0338410 A1 Dec. 19, 2013

(51) Int. Cl.
| | | |
|---|---|---|
| *C07C 1/00* | (2006.01) | |
| *C07C 2/66* | (2006.01) | |
| *C07C 2/70* | (2006.01) | |
| *C07C 5/327* | (2006.01) | |
| *C07C 7/10* | (2006.01) | |
| *C10G 63/02* | (2006.01) | |
| *C10G 25/02* | (2006.01) | |
| *C10G 29/20* | (2006.01) | |

(Continued)

(52) U.S. Cl.
CPC *C10G 63/02* (2013.01); *C10G 3/46* (2013.01); *C10G 3/50* (2013.01); *C10G 9/00* (2013.01); *C10G 17/02* (2013.01); *C10G 25/02* (2013.01); *C10G 29/205* (2013.01); *C10G 35/04* (2013.01); *C10G 45/68* (2013.01); *C10G 67/00* (2013.01); *C10G 67/06* (2013.01); *C10G 67/08* (2013.01); *C10G 69/00* (2013.01); *C10G 69/123* (2013.01); *C10G 69/14* (2013.01); *C10G 2300/1011* (2013.01); *C10G 2300/30* (2013.01)

(58) Field of Classification Search
CPC .............. C07C 2/66; C07C 1/00; C07C 2/70; C07C 5/327; C07C 7/10
USPC ......... 585/323, 240, 467, 468, 464, 463, 654, 585/857; 208/133
See application file for complete search history.

(56) References Cited

U.S. PATENT DOCUMENTS

| | | | |
|---|---|---|---|
| 7,982,076 B2 | 7/2011 | Marker et al. | |
| 8,003,836 B2 | 8/2011 | Marker et al. | |

(Continued)

FOREIGN PATENT DOCUMENTS

| | | |
|---|---|---|
| CN | 101514314 A | 8/2009 |
| RU | 93055135 A | 12/1996 |

(Continued)

OTHER PUBLICATIONS

UOP A Honeywell Company, "Unmatched Process Experience Combined With The Highest-Performance Catalysts," Jun. 14, 2012, http://www.uop.com/processing-solutions/refining/gasoline/.

(Continued)

*Primary Examiner* — Thuan D Dang (57) ABSTRACT

A method for producing a linear alkylbenzene product from a bio-renewable feedstock having a mixture of naturally-derived hydrocarbons includes separating the mixture of naturally-derived hydrocarbons into a naphtha portion and a distillate portion, reforming the naphtha portion, and using a high purity aromatics recovery process on the reformed naphtha portion to produce benzene. The method further includes separating a normal paraffins portion from the distillate portion and dehydrogenating the normal paraffins portion to produce mono-olefins. Still further, the method includes reacting the benzene and the mono-olefins to produce the linear alkylbenzene product.

10 Claims, 4 Drawing Sheets

(51) Int. Cl.
  *C10G 35/04*   (2006.01)
  *C10G 45/68*   (2006.01)
  *C10G 67/00*   (2006.01)
  *C10G 67/06*   (2006.01)
  *C10G 67/08*   (2006.01)
  *C10G 69/00*   (2006.01)
  *C10G 69/12*   (2006.01)
  *C10G 69/14*   (2006.01)
  *C10G 3/00*    (2006.01)
  *C10G 9/00*    (2006.01)
  *C10G 17/02*   (2006.01)

(56) References Cited

U.S. PATENT DOCUMENTS

| | | |
|---|---|---|
| 8,039,682 B2 | 10/2011 | McCall et al. |
| 2004/0176654 A1* | 9/2004 | Abazajian ............... 585/323 |
| 2011/0083936 A1 | 4/2011 | Yuan et al. |
| 2011/0118516 A1 | 5/2011 | Senetar et al. |
| 2011/0136655 A1 | 6/2011 | Lapinski et al. |
| 2011/0147265 A1 | 6/2011 | Serban et al. |
| 2011/0152589 A1 | 6/2011 | Serban et al. |
| 2011/0275871 A1 | 11/2011 | Sanchez et al. |
| 2012/0136185 A1 | 5/2012 | Bressler |
| 2012/0142983 A1 | 6/2012 | Vermeiren et al. |

FOREIGN PATENT DOCUMENTS

| | | |
|---|---|---|
| RU | 2204585 C2 | 5/2003 |
| WO | 2009/007166 A1 | 1/2009 |

OTHER PUBLICATIONS

UOP A Honeywell Company, "Optimized, Integrated Complex Delivers Minimal Investment Cost and Lowest Cost of Production," Jun. 14, 2012, http://www.uop.com/processing-solutions/petrochemicals/benzene-para-xylene-production/.

UOP A Honeywell Company, "Fueling LAB Production: Normal Paraffins From Kerosene," Jun. 14, 2012, http://www.uop.com/processing-solutions/petrochemicals/detergents/.

UOP A Honeywell Company, "A Compatible & Sustainable Fuel Option," Jun. 14, 2012, http://www.uop.com/processing-solutions/biofuels/green-diesel/.

UOP A Honeywell Company, "UOP Molex™ Process for N-Paraffin Production," Jun. 14, 2012, http://www.uop.com/nparrafin-molex/.

UOP A Honeywell Company, "Reliable, High Purity and Efficient Aromatics Recovery to Enhance Profitability," Jun. 14, 2012, http://www.uop.com/processing-solutions/petrochemicals/benzene-para-xylene-production/#xylene-recovery.

Stoot, Thomas J. et al., "UOP Sulfolane Process" Handbook of Petroleum Refining Processes—McGraw-Hill (Meyers, R.A., 2nd Edition, 1996) Chapter 2.2.

Search Report dated Sep. 5, 2013 for corresponding PCT Application No. US2013/037687.

* cited by examiner

METHODS FOR PRODUCING LINEAR ALKYLBENZENES FROM BIO-RENEWABLE FEEDSTOCKS

TECHNICAL FIELD

The present disclosure relates generally to methods for producing detergent compounds, and more particularly the present disclosure relates to methods for producing linear alkylbenzenes from bio-renewable feedstocks.

BACKGROUND

While detergents made utilizing linear alkylbenzene-based surfactants are biodegradable, existing processes for creating linear alkylbenzenes are not based on renewable sources. Specifically, linear alkylbenzenes are traditionally produced from kerosene extracted from the earth. Due to the growing environmental concerns over fossil fuel extraction and economic concerns over exhausting fossil fuel deposits, there is a demand for using alternate feed sources for producing biodegradable surfactants for use in detergents and in other industries.

Accordingly, it is desirable to provide methods for producing linear alkylbenzenes from a bio-renewable feedstock, i.e., a feedstock that is not extracted from the earth. Furthermore, other desirable features and characteristics will become apparent from the subsequent detailed description and the appended claims, when taken in conjunction with the accompanying drawing and this background.

BRIEF SUMMARY

Methods for producing linear alkylbenzenes product from a bio-renewable feedstock are provided herein. In accordance with an exemplary embodiment, a method for producing a linear alkylbenzene product from a bio-renewable feedstock having a mixture of naturally-derived hydrocarbons includes separating the mixture of naturally-derived hydrocarbons into a naphtha portion and a distillate portion, reforming the naphtha portion, and using a high purity aromatics recovery process on the reformed naphtha portion to produce benzene. The method further includes separating a normal paraffins portion from the distillate portion and dehydrogenating the normal paraffins portion to produce mono-olefins. Still further, the method includes reacting the benzene and the mono-olefins to produce the linear alkylbenzene product.

In another exemplary embodiment, a method for producing a linear alkylbenzene product from a bio-renewable feedstock having a natural oil includes hydrogenating, deoxygenating, isomerizing, and selective hydrocracking the renewable feedstock to produce a hydrocarbon mixture, separating the hydrocarbon mixture into a naphtha portion and a distillate portion, reforming the naphtha portion, and using a high purity aromatics recovery process on the reformed naphtha portion to produce benzene. The method further includes separating a normal paraffins portion from distillate portion and dehydrogenating the normal paraffins portion to produce mono-olefins. Still further, the method includes reacting the benzene and the mono-olefins to produce the linear alkylbenzene product.

In accordance with yet another exemplary embodiment, a method for producing a linear alkylbenzene product from a bio-renewable feedstock having a mixture of naturally-derived hydrocarbons includes separating the mixture of naturally-derived hydrocarbons into a naphtha portion and first and second distillate portions. The method further includes reforming the naphtha portion and using a high purity aromatics recovery process on the reformed naphtha portion to produce benzene. Still further, the method includes separating a normal paraffins portion from the first distillate portion and dehydrogenating the normal paraffins portion to produce mono-olefins. Still further, the method includes reacting the benzene and the mono-olefins to produce the linear alkylbenzene product.

BRIEF DESCRIPTION OF THE DRAWINGS

Embodiments of the present disclosure will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
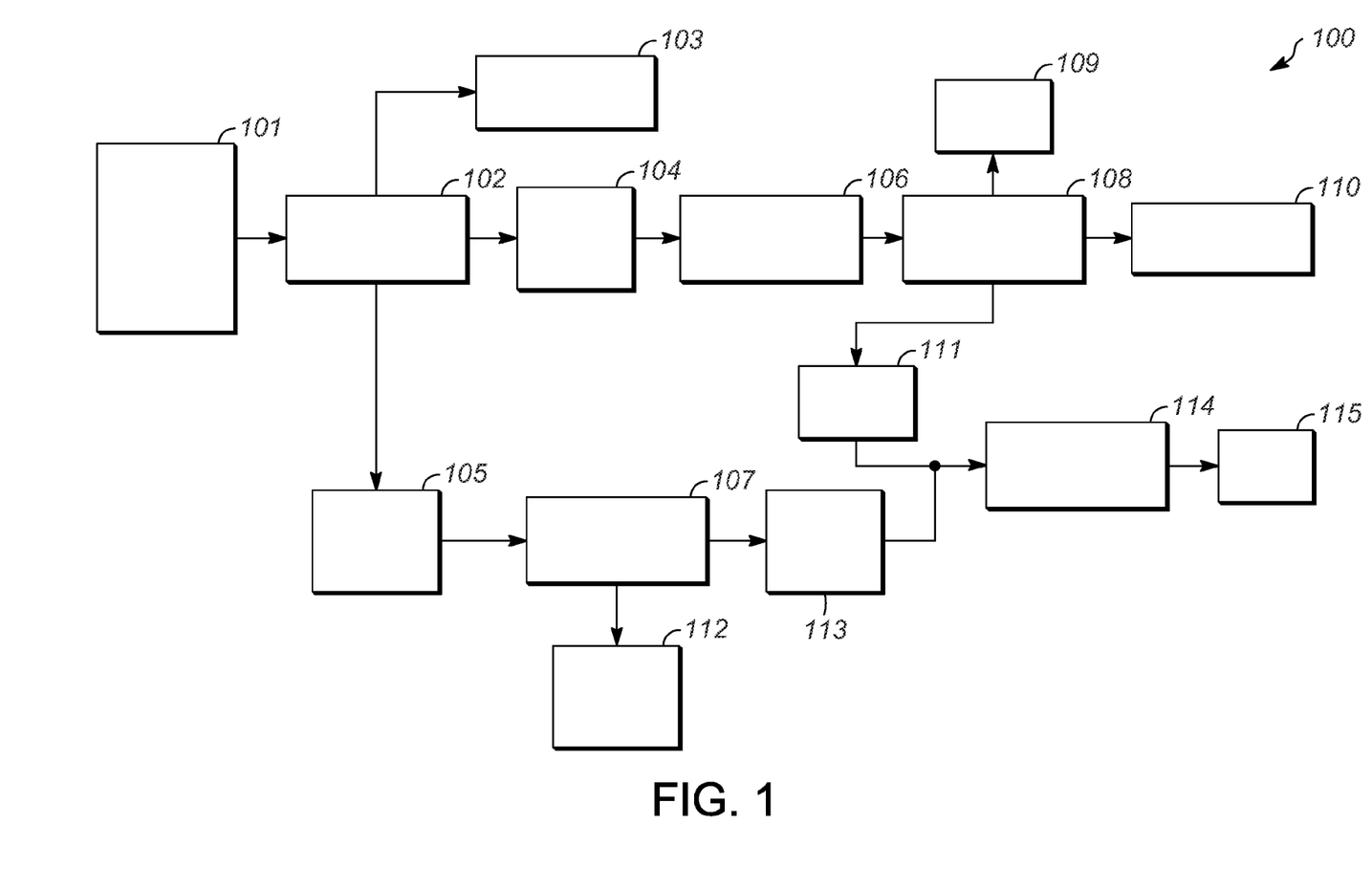
FIG. 1 schematically illustrates an exemplary embodiment of a system utilizing a process for producing linear alkylbenzenes from bio-renewable feedstocks.

Various embodiments contemplated herein relate to methods for producing linear alkylbenzenes from bio-renewable feedstocks. FIG. 1 schematically illustrates a system 100 utilizing a process for producing linear alkylbenzenes from bio-renewable feedstocks in accordance with an exemplary embodiment. The system 100 includes a bio-renewable feedstock source 101. The bio-renewable feedstock source 101 includes one or more natural oils such as those derived from plant or algae matter. As used herein, natural oils include oils that are not based on kerosene or other fossil fuels. The natural oils suitable for use herein include, but are not limited to, one or more of coconut oil, babassu oil, castor oil, algae byproduct, beef tallow oil, borage oil, camelina oil, Canola® oil, choice white grease, coffee oil, corn oil, *Cuphea Viscosissima* oil, evening primrose oil, fish oil, hemp oil, hepar oil, jatropha oil, *Lesquerella Fendleri* oil, linseed oil, *Moringa Oleifera* oil, mustard oil, neem oil, palm oil, perilla seed oil, pongamia seed oil, pennycress seed oil, carinata seed oil, poultry fat, rice bran oil, soybean oil, stillingia oil, sunflower oil, tung oil, tall oil, yellow grease, cooking oil, and other vegetable, nut, or seed oils. Other natural oils will be known to those having ordinary skill in the art. The natural oils typically include glycerides, such as triglycerides, free fatty acids (FFAs), or a combination of both, and other trace compounds and impurities. The glycerides and FFAs of natural oils contain aliphatic hydrocarbon chains in their structure that have about 8 to about 24 carbon atoms with a majority of the oils containing high concentrations of fatty acids with 16 and 18 carbon atoms.

The bio-renewable feedstocks that can be used in the embodiments described herein may contain a variety of impurities. For example, tall oil is a by-product of the wood processing industry and contains esters and rosin acids in addition to FFAs. Rosin acids are cyclic carboxylic acids. The renewable feedstocks may also contain contaminants such as alkali metals, e.g. sodium, potassium, and phosphorous, as well as solids, water, and detergents. As such, it is desirable to remove as much of these contaminants as possible. One optional treatment step for the removal of impurities from the bio-renewable feedstock includes contacting the bio-renewable feedstock with an ion-exchange resin in a pretreatment zone (not illustrated) at pretreatment conditions. The ion-exchange resin is an acidic ion-exchange resin and can be used as a bed in a reactor through which the feedstock is flowed. Another optional treatment step for removing contaminants is a mild acid wash. This treatment is carried out by contacting the feedstock with an acid, such as sulfuric, nitric, or hydrochloric acid, in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner.

With continued reference to FIG. 1, the bio-renewable feedstock from the bio-renewable feedstock source 101 is flowed to a deoxygenation-hydrogenation-isomerization-selective hydrocracking unit 102. In the deoxygenation-hydrogenation-isomerization-selective hydrocracking unit 102, the feedstock is contacted in the presence of hydrogen at hydrogenation conditions with a composite catalyst, a first portion of which is a hydrogenation or hydrotreating catalyst. Hydrogenation or hydrotreating catalysts are any of those well known in the art such as nickel or nickel/molybdenum, or cobalt or cobalt/molybdenum, dispersed on an oxide support. Other hydrogenation catalysts include one or more noble metal catalytic elements dispersed on an oxide support. Non-limiting examples of noble metals include platinum and/or palladium dispersed on gamma-alumina. Operating conditions for the hydrogenation zone are well known in the art.

With regard to the isomerization and selective hydrocracking functions of the deoxygenation-hydrogenation-isomerization-selective hydrocracking unit 102, a second portion of the composite catalyst may contain a zeolite with an acid function capable of catalyzing the isomerization and selective hydrocracking reactions. The zeolite concentration can range from about 1 to about 99 weight percent of the catalyst composite, depending upon the type of zeolite employed and the operating conditions. In one embodiment, the zeolite contains medium to large size pores with 10-12 member rings such as BEA, MOR, MFI, or FAU. In other embodiments, the cracking function is a non-crystalline acid site found in materials such as amorphous silica-alumina. In yet another embodiment, a portion of the support has an external surface area that is greater than about 150 m$^2$/g, and has greater than 45 Å average pore diameter, for maximum accessibility of the large triglyceride molecules to the catalytic active sites. It will be appreciated that a highly-porous structure with relatively large openings, such as the one described above with regard to the exemplary catalyst, will reduce diffusion problems that might otherwise prevent the large glyceride molecules from contacting the active sites of the catalyst. Furthermore, such pores will prevent diffusional resistance for the aviation-range paraffins produced in this catalytic process and prevent further cracking to lower value light products. Examples of catalysts, or sets of catalysts, successful in catalyzing the deoxygenation, hydrogenation, isomerization, and selective hydrocracking reactions in the same reaction zone include platinum dispersed on a support containing Y-zeolite. Another example is platinum and palladium on a support containing Y-zeolite bound with amorphous silica alumina.

An example of a set of catalysts includes sulfided NiMo supported on amorphous silica alumina or platinum supported on amorphous silica alumina.

The catalysts enumerated above are also capable of catalyzing decarboxylation, decarbonylation, and/or hydrodeoxygenation of the feedstock to remove oxygen. Decarboxylation, decarbonylation, and hydrodeoxygenation are collectively referred to herein as deoxygenation reactions. Structurally, triglycerides are formed by three, typically different, fatty acid molecules that are bonded together with a glycerol bridge. The glycerol molecule includes three hydroxyl groups (HO—), and each fatty acid molecule has a carboxyl group (COOH). In triglycerides, the hydroxyl groups of the glycerol join the carboxyl groups of the fatty acids to form ester bonds. Therefore, during deoxygenation, the fatty acids are freed from the triglyceride structure and are converted into linear paraffins. The glycerol is converted into propane, and the oxygen in the hydroxyl and carboxyl groups is converted into either water or carbon dioxide. The deoxygenation reaction for fatty acids (1) and triglycerides (2) are illustrated, respectively, as:

During the deoxygenation reaction, the length of a product paraffin chain $R''$ will vary by a value of one depending on the exact reaction pathway. For example, if carbon dioxide is formed, then the chain will have one fewer carbon than the fatty acid source ($R''$). If water is formed, then the chain will match the length of the $R''$ chain in the fatty acid source. Typically, due to the reaction kinetics, water and carbon dioxide are formed in roughly equal amounts, such that equal amounts of $C_X$ paraffins and $C_{X-1}$ paraffins are formed.

Since hydrogenation is an exothermic reaction, as the feedstock flows through the catalyst bed the temperature increases and decarboxylation and hydrodeoxygenation will begin to occur. Thus, it is envisioned and is within the scope of this disclosure that all dehydrogenation/deoxygenation reactions, as well as the isomerization and selective hydrocracking reactions, occur simultaneously in one reactor or in one bed, such as deoxygenation-hydrogenation-isomerization-selective hydrocracking unit 102. Alternatively, the conditions can be controlled such that more than one reactor or bed is used. For example, the conditions can be controlled such that hydrogenation primarily occurs in one bed and deoxygenation occurs in a second bed.

The reaction product from the deoxygenation-hydrogenation-isomerization-selective hydrocracking reactions in the deoxygenation-hydrogenation-isomerization-selective hydrocracking unit 102 may include a "light ends" portion 103, which includes hydrocarbon molecules having typically 4 carbon atoms or less, such as propane and butane. The reaction product from the deoxygenation-hydrogenation-isomerization-selective hydrocracking reactions in the deoxygenation-hydrogenation-isomerization-selective hydrocracking unit 102 will further include a naphtha portion 104, which includes a mixture of hydrocarbon molecules typically having between 5 and 8 carbon atoms. Still further, the reaction product from the deoxygenation-hydrogenationisomerization-selective hydrocracking reactions in the deoxygenation-hydrogenation-isomerization-selective hydrocracking unit 102 zone will include a distillate portion 105, which includes a mixture of hydrocarbon molecules typically having between 9 and 18 carbon atoms or higher. Distillate portion 105 includes hydrocarbons that are suitable for use in producing aviation and/or diesel fuel, for example. Of course, different feedstocks will result in different distributions of paraffins.

With continued reference to FIG. 1, the naphtha portion 104 is further processed through a reforming unit 106 and a high purity aromatics recovery unit 108. In one embodiment, catalytic reforming is employed in reforming unit 106. In a typical catalytic reforming zone, the reactions include dehydrogenation, dehydrocyclization, isomerization, and hydrocracking. The dehydrogenation reactions typically will be the dehydrogenation of paraffins to olefins, and the dehydrogenation of cyclic paraffins and cyclic olefins to aromatics. The dehydrocyclization reactions typically will be dehydrocyclization of olefins and paraffins to cycloparaffins. The isomerization reactions include isomerization of n-paraffins to isoparaffins, the isomerization of alkylcyclopentanes to alkylcyclohexanes, the isomerization of cyclohexanes to alkylcycloparaffins, the hydroisomerization of n-paraffins to isoparaffins, and the isomerization of substituted aromatics. Further, the hydrocracking reactions include the hydrocracking of paraffins and olefins. Exemplary catalysts suitable for use with the reforming unit 106 are described in commonly assigned U.S. Pat. No. 7,875,757 and United States Patent Application Publication Nos. 2011/0118516, 2011/0136655, 2011/0147265, 2011/0152589, 2011/0083936.

As noted above, the products produced from the reforming unit 106 are further processed in the high purity aromatics recovery separation process unit 108. The high purity aromatics recovery separation process unit 108 is primarily provided to separate benzene from other components in the reformate product. The high purity aromatics recovery separation unit 108, in one particular example, uses a 2,3,4,5-tetrahydrothiophene-1,1-dioxide solvent to extract benzene from other reforming products through liquid-liquid extraction and/or extractive distillation at high purity, for example greater than about 80% purity. An exemplary process associated with the use of this solvent is described in R. A. Meyers, "Handbook of Petroleum Refining Processes," 2d ed. 1996, ch. 2.2. In this example, three products are produced from the high purity aromatics recovery separation process unit 108, including a gasoline byproduct 109 (i.e., the reformate product having the benzene, toluene, and xylene removed therefrom), a toluene/xylene mixture byproduct 110, and the primary benzene product 111.

With continued reference to FIG. 1, and referring back to the distillate portion 105 produced from the deoxygenation-hydrogenation-isomerization-selective hydrocracking unit 102, the distillate portion 105 is passed to a separator 107 to separate linear (n-) paraffins from branched or cyclic compounds that are included in the distillate portion 105. A suitable separator 107 for this purpose is a separator that operates using a liquid-state separation of normal paraffins from branched and cyclic components is described in R. A. Meyers, "Handbook of Petroleum Refining Processes," 2d ed. 1996, chs. 10.3 and 10.7. Other separators known in the art are suitable for use herein as well. Two products are produced from the separator 107, including a distillate product 112 without normal paraffins and a normal paraffins product 113.

As illustrated in FIG. 1, the benzene product produced from the high purity aromatics recovery separation process unit 108 and the normal paraffins product 113 produced from the separator 107 are passed to a linear alkylbenzene production unit 114. In the linear alkylbenzene production unit 114, the normal paraffins are dehydrogenated into mono-olefins of the same carbon numbers as the normal paraffins. Typically, dehydrogenation occurs through known catalytic processes, such as the exemplary process described in R. A. Meyers, "Handbook of Petroleum Refining Processes," 2d ed. 1996, ch. 1.5. Di-olefins (i.e., dienes) and aromatics are also produced as an undesired result of the dehydrogenation reactions as expressed in the following equations:

Mono-olefin formation: $C_XH_{2X+2} \rightarrow C_XH_{2X} + H_2$

Di-olefin formation: $C_XH_{2X} \rightarrow C_XH_{2X-2} + H_2$

Aromatic formation: $C_XH_{2X-2} \rightarrow C_XH_{2X-6} + 2H_2$

To produce linear alkylbenzenes, the mono-olefins and the benzene are alkylated using an alkylation catalyst, such as a solid acid catalyst, that supports alkylation of the benzene with the mono-olefins. Hydrogen fluoride (HF) and aluminum chloride (AlCl$_3$) are two catalysts in commercial use for the alkylation of benzene with linear mono-olefins and may be used in the alkylbenzene production unit 114. Additional catalysts include zeolite-based or fluoridate silica alumina-based solid bed alkylation catalysts (for example, FAU, MOR, UZM-8, Y, X RE exchanged Y, RE exchanged X, amorphous silica-alumina, and mixtures thereof, and others known in the art). As a result of alkylation, a linear alkylbenzene product 115 is formed according to the reaction:

$C_6H_6 + C_XH_{2X} \rightarrow C_6H_5C_XH_{2X+1}$

Figure 2:
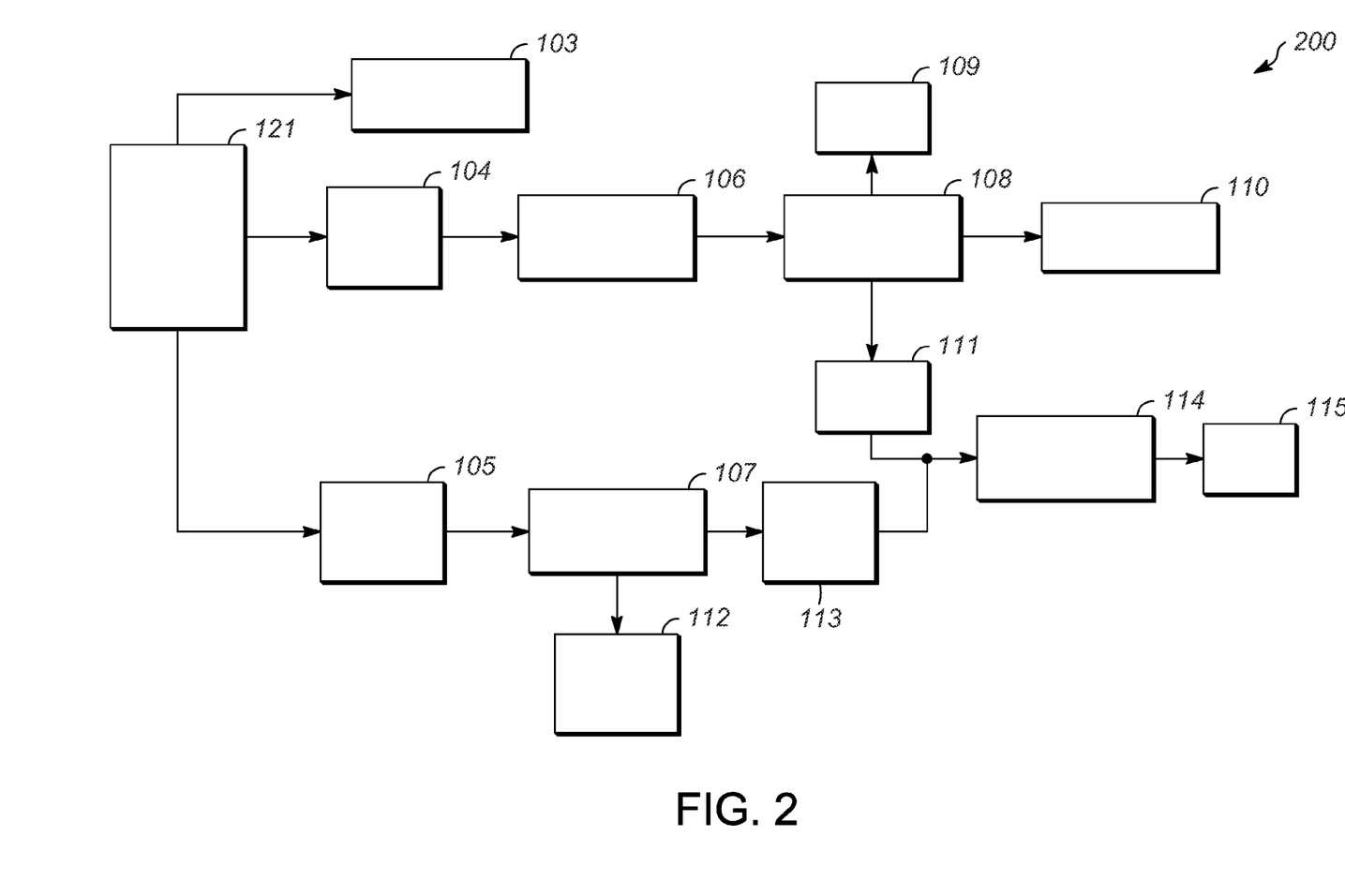
FIG. 2 schematically illustrates another exemplary embodiment of a system utilizing a process for producing linear alkylbenzenes from bio-renewable feedstocks.

In another embodiment, FIG. 2 schematically illustrates an exemplary system 200 utilizing a process for producing linear alkylbenzenes from bio-renewable feedstocks. System 200 differs from system 100 in the bio-renewable feedsource provided. In contrast to system 100, which as noted above, uses a bio-renewable feedstock source 101 including one or more natural oils such as those derived from plant or algae matter, system 200 uses a feedstock source 121 that includes a mixture of hydrocarbons derived from renewable sources. The mixture of hydrocarbons can include hydrocarbons having typically between 1 and 22 or more carbon atoms per molecule. A suitable mixture of hydrocarbons for the feedstock 121 can be produced from renewable sources using, for example, the processes described in commonly assigned U.S. Pat. No. 7,982,076 to Marker et al. and U.S. Pat. No. 8,039,682 to McCall et al. The feedstock source 121 can be separated into a "light ends" portion 103, a naphtha portion 104, and a distillate portion 105, and processed as described above with regard to FIG. 1 into a linear alkylbenzene product 115.

Figure 3:
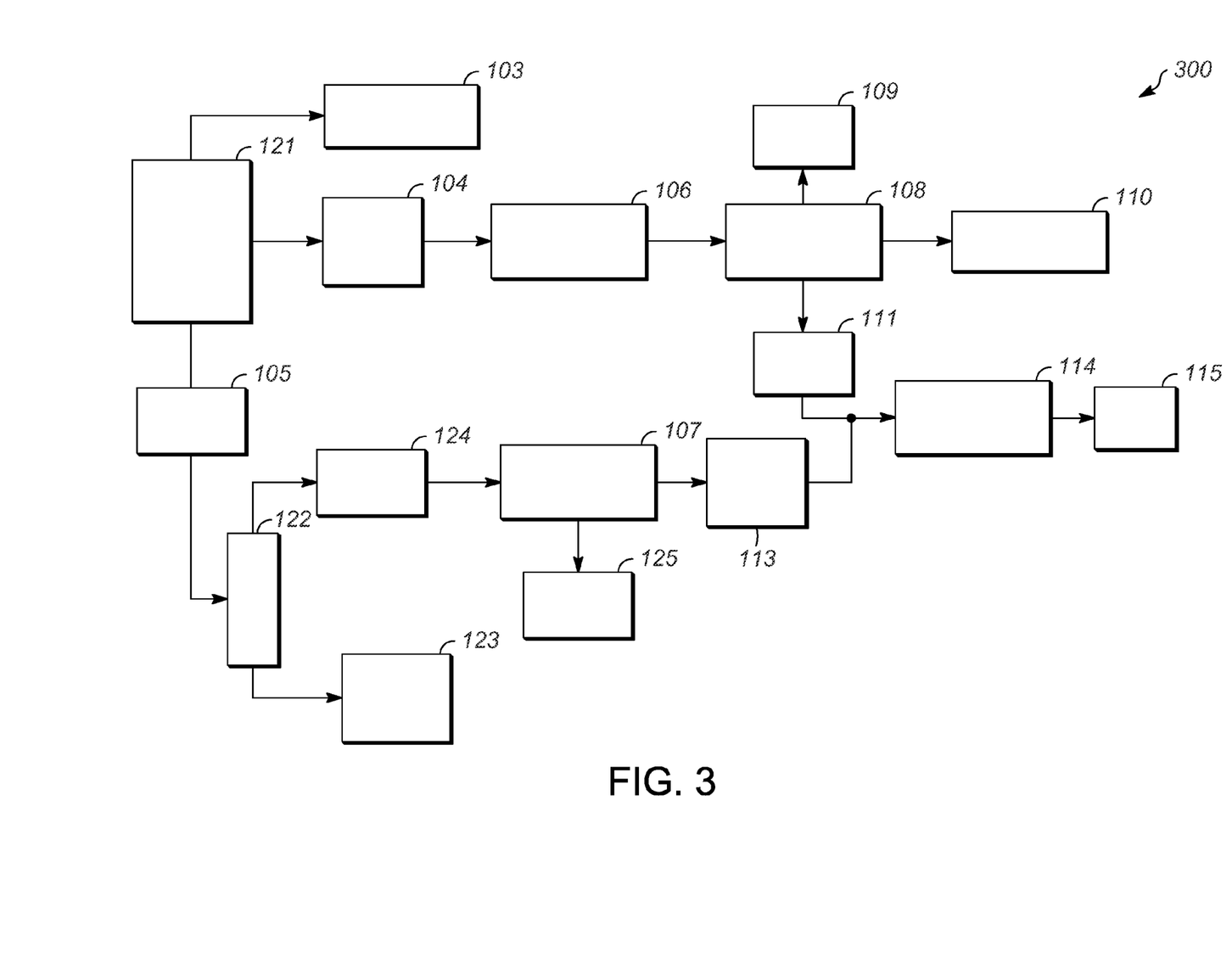
FIG. 3 schematically illustrates yet another exemplary embodiment of a system utilizing a process for producing linear alkylbenzenes from bio-renewable feedstocks.

In yet another embodiment, FIG. 3 schematically illustrates an exemplary system 300 utilizing a process for producing linear alkylbenzenes from bio-renewable feedstocks. System 300 differs from systems 100 and 200 in the processing of the distillate portion 105. In system 300, a separator 122 is provided to separate the distillate portion 105 into a first distillate portion 124 and a second distillate portion 123. In one example, the first distillate portion 124 can include distillate hydrocarbons suitable for use as aviation fuel. The second distillate portion 123 can include distillate hydrocarbons suitable for use as diesel fuel, and can include hydrocarbons having 16 carbon atoms and higher. Of course, distillate portion 105 can, in other embodiments, be separated into three or more portions.

With continued reference to the example wherein the first distillate portion 124 includes distillate hydrocarbons suitable for use as aviation fuel and the second distillate portion 123 can include distillate hydrocarbons suitable for use as diesel fuel, it will be appreciated that aviation fuel can overlap diesel fuel (with regard to their hydrocarbon composition) at heavier boiling point ranges, and the separation of the two components can be controlled to meet the desired specification properties of the first and second distillate portions 124/ 123. For example, a portion including hydrocarbons suitable for use as aviation fuel will include one or more hydrocarbons whose chemical and physical properties meet the target aviation fuel specifications. For example, aviation turbine fuels, a kerosene type fuel including JP-8, are specified by MIL-DTL-83133, JP-4, a blend of gasoline, kerosene and light distillates, is specified by MIL-DTL-5624 and JP-5 a kerosene type fuel with low volatility and high flash point is also specified by MIL-DTL 5624, with the written specification of each being periodically revised. Often a distillation range from 10 percent recovered to a final boiling point is used as a key parameter defining different types of fuels. The distillations ranges are typically measured by ASTM Test Method D 86 or D 2887. Therefore, blending of different components in order to meet the specification is quite common. Further, a portion including hydrocarbons suitable for use as diesel fuel will include a hydrocarbon or hydrocarbons heavier than the aviation fuel portion whose chemical and physical properties meet the target diesel fuel specifications. Examples of diesel fuel specifications include ASTM D975, EN590 and/or F76.

As shown in FIG. 3, only the first distillate portion 124 is passed to the separator 107 for removing normal paraffins, thereby producing a distillate product 125 without normal paraffins. With continued reference to the example presented above wherein the first portion 124 includes hydrocarbons suitable for use as aviation fuel, as is known in the art, industrial standards for the production of aviation fuel require that normal paraffins be reduced to a much greater extent than necessary for diesel due to more stringent cold temperature property specifications. As such, by separating the distillate 105 in the separator 122, only a portion of the distillate 105, such as first portion 124, is required to be passed to the separator 107 for removing normal paraffins, thereby reducing costs in the operation of the separator 107.

Figure 4:
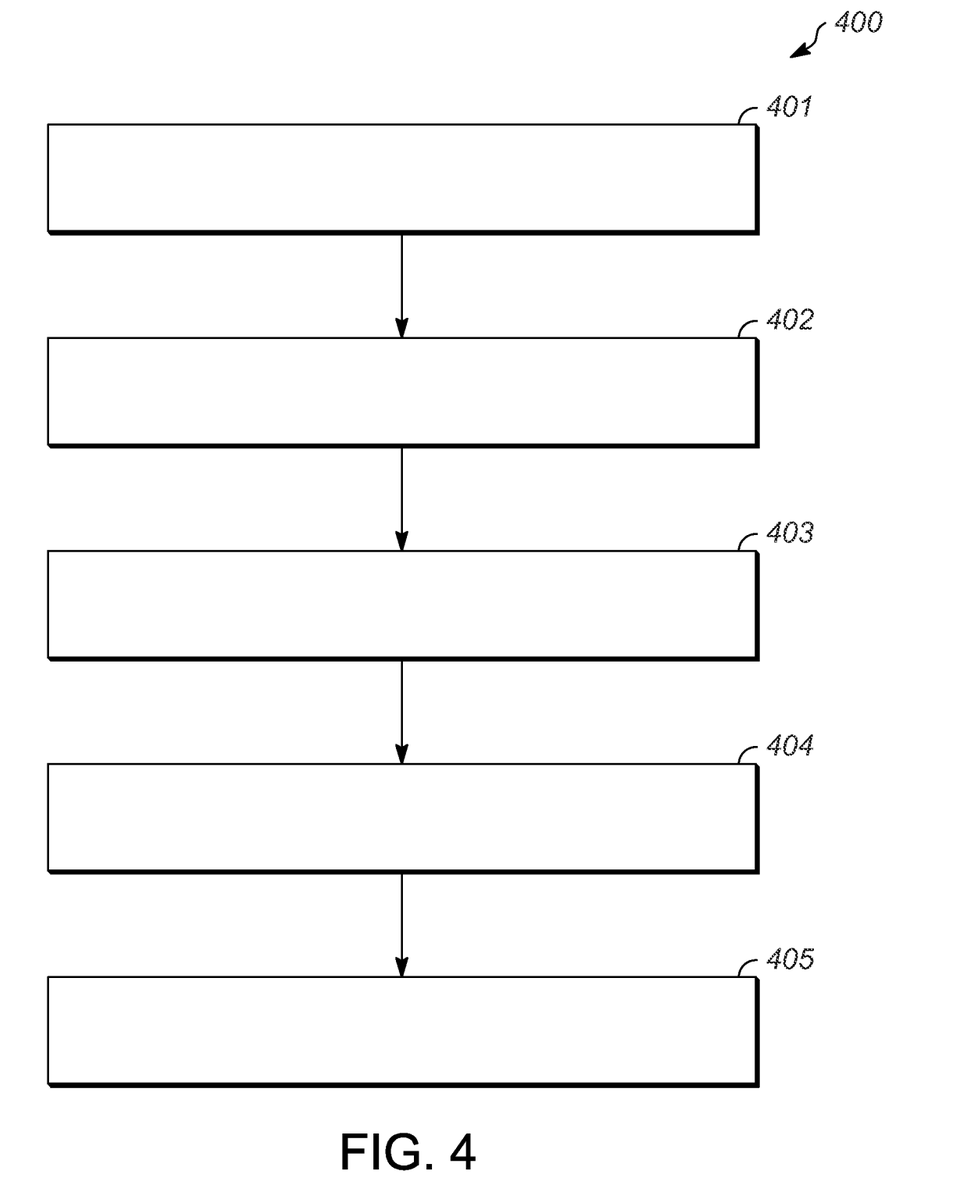
FIG. 4 is a flowchart illustrating a process for producing linear alkylbenzenes from bio-renewable feedstocks in accordance with an embodiment.

A process 400 for producing linear alkylbenzenes from bio-renewable feedstocks in accordance with an exemplary embodiment is provided with reference to FIG. 4. The process 400 includes a step 401 of hydrogenating, deoxygenating, isomerizing, and selective hydrocracking the renewable feedstock to produce a hydrocarbon mixture. The process 400 continues with a step 402 of separating the hydrocarbon mixture into a naphtha portion and a distillate fuel portion. Thereafter, at step 403, the process 400 includes reforming the naphtha portion and using a high purity aromatics recovery separation process on the reformed naphtha portion to produce benzene. At step 404, the process 400 includes separating a normal paraffins portion from the distillate fuel portion and dehydrogenating the normal paraffins portion to produce mono-olefins. Steps 403 and 404 can be performed in any order, and can optionally be performed in parallel. Further, at step 405, the process concludes with reacting the benzene and the mono-olefins to produce the linear alkylbenzene product.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for producing a linear alkylbenzene product from a bio-renewable feedstock comprising a natural oil, the method comprising the steps of:
   hydrogenating, deoxygenating, isomerizing, and selectively hydrocracking the renewable feedstock in a hydrogenating-deoxygenating-isomerizing-selectively hydrocracking unit containing a composite catalyst comprising a first portion comprising a catalyst comprising nickel or nickel/molybdenum or cobalt, cobalt/molybdenum or sulfided NiMo supported on amorphous silica-alumina or platinum on amorphous silica-alumina and a second portion comprising a catalyst comprising platinum and/or palladium on a support containing on Y-zeolite bound with amorphous silica-alumina to produce a hydrocarbon mixture to produce a hydrocarbon mixture;
   separating the hydrocarbon mixture into a naphtha portion and a distillate portion;
   reforming the naphtha portion in the presence of a reforming catalyst to produce a reformate product containing benzene;
   separating the reformate product in a high purity aromatics extraction separation unit by using a 2,3,4,5-tetrahydrothiophene-1,1-dioxide solvent to extract benzene to produce a high purity benzene stream;
   separating a normal paraffins portion from the distillate portion and dehydrogenating the normal paraffins portion to produce mono-olefins; and
   reacting the benzene and the mono-olefins in the presence of hydrogen fluoride or an aluminum chloride catalyst, or a solid bed alkylation catalyst comprising fluoridated silica alumina or zeolites comprising one or more of FAU, MOR, UZM-8, Y, X RE exchanged Y, RE exchanged X, amorphous silica-alumina, and mixtures thereof to produce the linear alkylbenzene product.

2. The method of claim 1, wherein separating the normal paraffins portion from the distillate portion comprises a liquid-state separation of normal paraffins from branched and cyclic components.

3. The method of claim 1, wherein dehydrogenating the normal paraffins portion to produce mono-olefins comprises catalytically dehydrogenating the normal paraffins.

4. The method of claim 1, wherein the naphtha portion comprises one or a plurality of hydrocarbons having from 5 to 8 carbon atoms per molecule.

5. The method of claim 1, wherein separating the hydrocarbon mixture into a distillate portion comprises separating the hydrocarbon mixture into a portion comprising one or a plurality of hydrocarbons having between 9 and 18 carbon atoms.

6. The method of claim 1, further comprising separating the hydrocarbon mixture into a light ends portion.

7. The method of claim 1, wherein producing a linear alkylbenzene product from a bio-renewable feedstock comprising a natural oil comprises producing a linear alkylbenzene product from a bio-renewable feedstock comprising one or more of coconut oil, babassu oil, castor oil, algae byproduct, beef tallow oil, borage oil, camelina oil, Canola® oil, choice white grease, coffee oil, corn oil, *Cuphea Viscosissima* oil, evening primrose oil, fish oil, hemp oil, hepar oil, jatropha oil, *Lesquerella Fendleri* oil, linseed oil, *Moringa Oleifera* oil, mustard oil, neem oil, palm oil, perilla seed oil, pongamia seed oil, pennycress seed oil, carinata seed oil, poultry fat, rice bran oil, soybean oil, stillingia oil, sunflower oil, tung oil, yellow grease, and cooking oil.

8. The method of claim 1, further comprising removing contaminants from the bio-renewable feedstock.

9. The method of claim 8, wherein removing contaminants from the bio-renewable feedstock comprises contacting the bio-renewable feedstock with an ion-exchange resin in a pre-treatment zone.

10. The method of claim 8, wherein removing contaminants from the bio-renewable feedstock comprises contacting the feedstock with one or more of sulfuric, nitric, or hydrochloric acid.

* * * * *